United States Patent
Słodczyk et al.

(10) Patent No.: US 11,162,393 B2
(45) Date of Patent: Nov. 2, 2021

(54) ROTARY VALVES

(71) Applicant: Hamilton Sundstrand Corporation, Charlotte, NC (US)

(72) Inventors: Damian Słodczyk, Wrocław (PL); Bartosz Solarz, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/571,241

(22) Filed: Sep. 16, 2019

(65) Prior Publication Data

US 2020/0088070 A1 Mar. 19, 2020

(30) Foreign Application Priority Data

Sep. 14, 2018 (EP) .................... 18461607

(51) Int. Cl.
| | | |
|---|---|---|
| F01L 1/18 | (2006.01) | |
| F01L 7/18 | (2006.01) | |
| F16K 29/00 | (2006.01) | |
| F16K 37/00 | (2006.01) | |
| F01L 3/00 | (2006.01) | |
| F01L 9/21 | (2021.01) | |

(52) U.S. Cl.
CPC .............. F01L 1/18 (2013.01); F01L 7/18 (2013.01); F16K 29/00 (2013.01); F16K 37/0041 (2013.01); *F01L 2003/11* (2013.01); *F01L 2009/2169* (2021.01)

(58) Field of Classification Search
CPC ....... F01L 1/18; F01L 7/18; F01L 2009/2169; F01L 2003/11; F16K 29/00; F16K 37/0041; F16K 31/16; F16K 31/1635; F16K 1/221; F16K 1/307; F16K 15/026; F16K 35/025; F16K 37/0016; F16K 31/602; F16K 1/224; F16K 31/535; F16K 35/022; F16K 35/10; Y10T 137/748; Y10T 137/0525; G05G 1/12
See application file for complete search history.

(56) References Cited

U.S. PATENT DOCUMENTS

| | | |
|---|---|---|
| 6,763,850 B1 | 7/2004 | Jansen et al. |
| 9,015,904 B2 | 4/2015 | Casebier |
| 2008/0060706 A1 | 3/2008 | Combs |
| 2009/0205722 A1* | 8/2009 | Sledz ............. F16K 35/025 137/383 |

(Continued)

FOREIGN PATENT DOCUMENTS

| | | |
|---|---|---|
| CN | 201884783 U | 6/2011 |
| EP | 2833041 A2 | 2/2015 |

OTHER PUBLICATIONS

Extended European Search Report for International Application No. 18461607.6 dated Mar. 21, 2019, 9 pages.

*Primary Examiner* — Vinh Luong
(74) *Attorney, Agent, or Firm* — Cantor Colburn LLP

(57) ABSTRACT

A rotary valve includes a valve shaft coupled to a rotary valve element. The valve shaft defines an axis and is rotatable thereabout. The valve further comprises a rotary position sensor and a coupling rotationally coupling the valve shaft and the sensor. A wrenching arm is rotationally coupled to the valve shaft, and extends radially outwardly of the axis for attachment of a wrenching tool thereto. The coupling is axially between the rotary position sensor and the wrenching arm.

15 Claims, 17 Drawing Sheets

(56) References Cited

U.S. PATENT DOCUMENTS

| | | | |
|---|---|---|---|
| 2010/0229964 A1* | 9/2010 | Ross, Jr. | F16K 31/26 |
| | | | 137/447 |
| 2011/0155939 A1 | 6/2011 | Casillas et al. | |
| 2014/0158919 A1* | 6/2014 | Burt | F16K 31/535 |
| | | | 251/4 |
| 2017/0082467 A1* | 3/2017 | Nelson | F16K 37/0083 |
| 2017/0102086 A1* | 4/2017 | Arnold | F16K 1/2265 |
| 2019/0301639 A1* | 10/2019 | Trieste, Jr. | F16K 37/0041 |

* cited by examiner

ROTARY VALVES

FOREIGN PRIORITY

This application claims priority to European Patent Application No. 18461607.6 filed Sep. 14, 2018, the entire contents of which is incorporated herein by reference.

BACKGROUND

The present disclosure relates to rotary valves, for example butterfly valves with rotary sensors.

Rotary valves, for example butterfly valves are known in the art for use in throttling or isolating fluid flow through a passage. They are used in a wide range of applications, for example as flow control valves in air conditioning systems used on aircraft.

Typically butterfly valves comprise a disk-shaped rotary flapper sized to the passage, the flapper able to rotate around a central axis. The flapper is rotatable between presenting a flat face of the disk to the flow direction, thereby preventing fluid flow, and presenting an edge to the flow direction, thereby substantially allowing fluid flow through the passage. The disk can also be rotated to any position between the two in order to partially throttle flow through the passage. Typically the valve is operated by means of a drive actuator, for example a hydraulic or electric motor, coupled to the valve by a suitable coupling.

Butterfly valves are sometimes provided with rotational sensors for detecting the actual rotational position of the flapper. This assists in control of the butterfly valve.

Other valves may include wrenching features, which are used to manually operate the butterfly valve in the event of a failure of the drive to the valve.

SUMMARY

The present disclosure provides a rotary valve comprising a valve shaft coupled to a rotary valve element. The valve shaft defines an axis and is rotatable thereabout. The valve further comprises a rotary position sensor and a coupling rotationally coupling the valve shaft and the sensor. A wrenching arm is rotationally coupled to the valve shaft, and extends radially outwardly of the axis for attachment of a wrenching tool thereto. The coupling is axially between the rotary position sensor and the wrenching arm.

The wrenching arm may be directly coupled to the valve shaft.

The wrenching arm may comprise a tooling connection disposed thereon. The tooling connection optionally comprises a protrusion of material or a cutaway.

In some embodiments, the wrenching arm may extend radially from the axis.

In some embodiments, the wrenching arm may comprise a first section extending generally transverse to the axis and a second section extending generally perpendicular from the first section. The tooling connection may optionally be disposed on the second section.

The wrenching arm may be formed from a unitary piece of sheet metal.

The wrenching arm may be keyed to the valve shaft.

In some embodiments, the rotary valve may further comprise a second arm, unitarily formed with the wrenching arm and axially separated therefrom. The second arm may be rotationally coupled to the sensor, the wrenching arm and second arm thereby together forming the coupling between the valve shaft and the sensor.

In some embodiments, the second arm may be flexible. For example the second arm may comprise a flexible serpentine portion.

In some embodiments, the coupling may comprise an upper and a lower portion axially separated by a deformable middle portion, the upper and lower portions being more rigid than the deformable middle portion. The sensor may be attached to the upper portion and the wrenching arm may be directly connected to the lower portion of the coupling.

The direct connection may comprise a dovetail slot having a closed end and an open end for receiving the wrenching arm.

The coupling may form an generally annular shape around the shaft, the annular shape being interrupted by a split extending axially along the coupling. The coupling may comprise a screw cooperating with a threaded hole on at least one side of the split, and the coupling engaging with the shaft on tightening of the screw. The screw may project over the open end of the dovetail slot to retain the wrenching arm therein.

The rotary valve may further comprise a valve housing. The shaft may extend axially through the valve housing. The valve housing may comprise a socket formed therein. The valve may further comprise a stop element for selective engagement with the socket. The socket may be positioned such that the wrenching arm may engage the stop element to prevent rotation of the wrenching arm around the axis.

The wrenching arm may comprise a blocking element for engagement with the stop element.

DETAILED DESCRIPTION OF THE FIGURES

Figure 1:
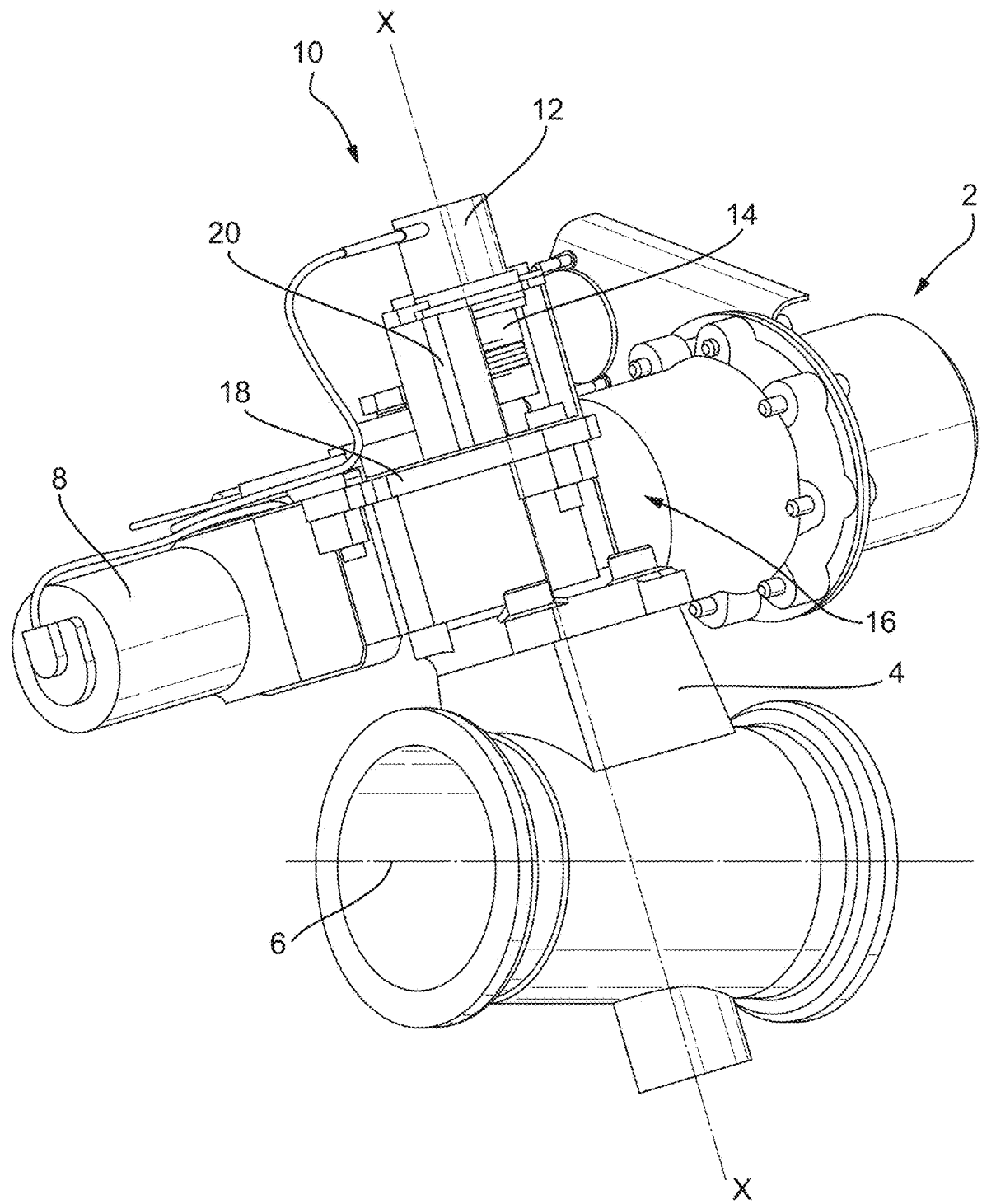
FIG. 1 shows a prior art butterfly valve with a rotary sensor.

FIG. 1 shows a prior art butterfly valve 2. The butterfly valve 2 comprises a valve housing 4 defining a fluid passageway 6 and a flapper (not shown) with a flapper shaft (not shown). The flapper shaft extends through the centre of the flapper, so that rotation of the flapper shaft actuates rotation of the flapper around an axis X of the shaft. Rotation of the flapper shaft is induced by an actuator 8. The actuator 8 may be of any known type, for example a hydraulic actuator, for example a hydraulic actuator controlled by a servo valve.

The butterfly valve 2 is provided with a rotary position sensor 10 such as a Rotary Variable Differential Transformer, positioned external to the fluid passageway 6. The rotary sensor 10 detects an angular displacement of the flapper via detecting a rotation of the flapper shaft, and provides an electrical signal output corresponding to the degree of rotation. The rotary sensor 10 comprises a sensor portion 12, operatively connected to the flapper shaft of the butterfly valve 2 through a coupling 14.

The rotary sensor 10 also comprises a mount 16, the mount 16 comprising a mount plate 18 mounted to the valve housing 4 and positioned axially below the coupling 14. The flapper shaft extends through the mount plate 18 and rotationally engages the coupling 14. The sensor mount 16 further comprises a support portion 20 extending axially from the mount plate 18, the support portion 20 being arranged around the coupling 14. The sensor portion 12 is mounted atop the support portion 20 and is axially separated from the mount plate 18 to provide room therebetween for the coupling 14.

The flapper shaft is operatively connected to the coupling 14 so that a rotation of the flapper shaft causes a corresponding rotation of the coupling 14. The flapper shaft itself may either be directly connected to the coupling 14, as in the embodiment shown, or the coupling 14 may be connected to a separate shaft which is in turn operatively connected to the flapper shaft to rotate therewith. The rotation of the coupling is, in turn, detected by the sensor portion 12.

The coupling 14 is torsionally resilient and configured to substantially absorb axial and/or transverse movement from the flapper shaft without transmitting the movement to the sensor portion 12, which might otherwise be damaged by forces or movement other than rotation.

Figure 2:
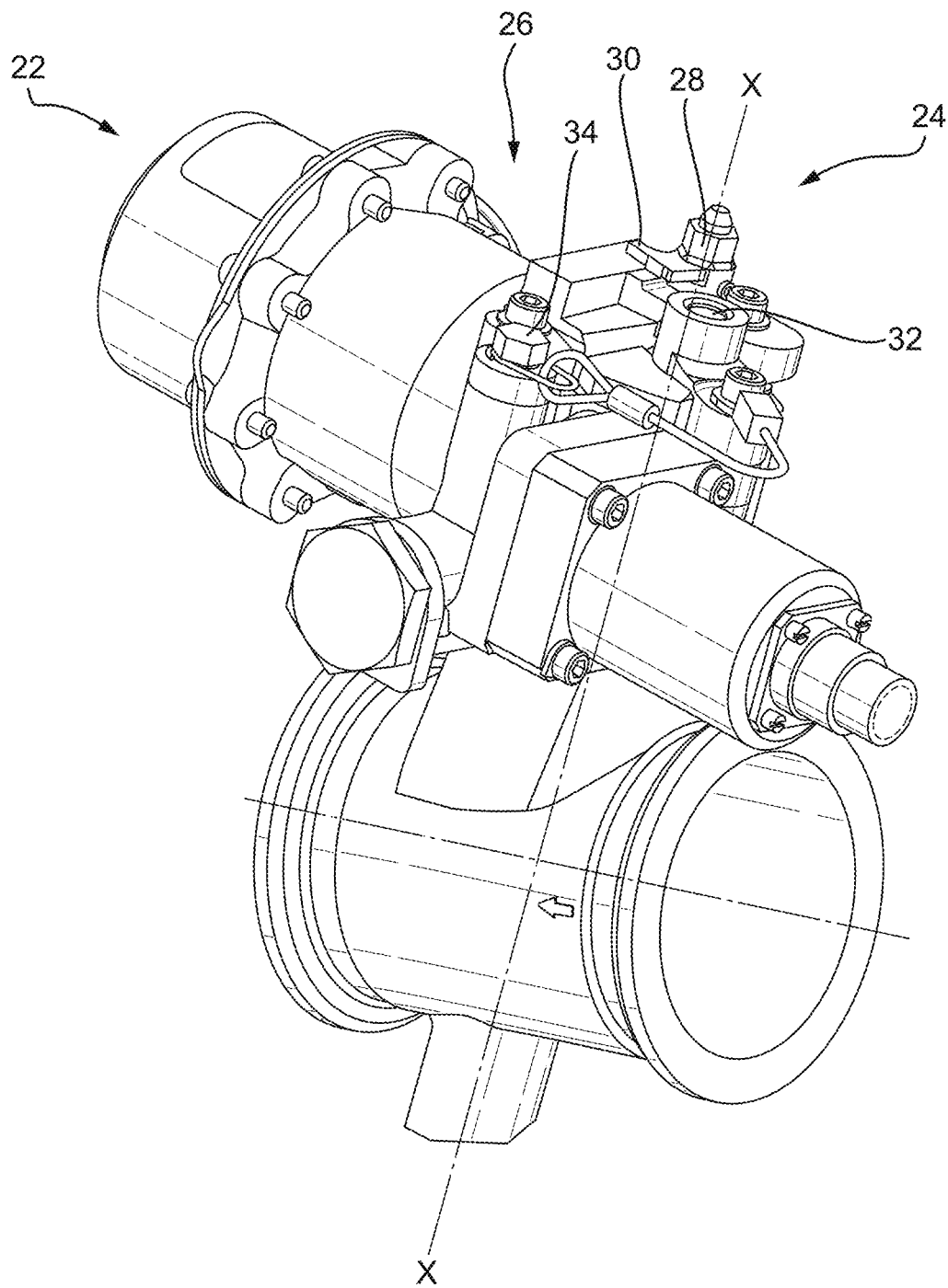
FIG. 2 shows another prior art butterfly valve with a wrenching mechanism.

FIG. 2 shows a further prior art butterfly valve 22 which does not incorporate a rotary position sensor. The butterfly valve 22 is otherwise similar to that of FIG. 1, and comprises a similar actuator 8.

In the event that the actuator 8 fails or malfunctions in some way, it may be necessary to manually open the butterfly valve 22, for example for operation or maintenance. To this end, the butterfly valve 22 is provided with a wrenching feature 24 and a locking system 26.

The wrenching feature 24 is connected to a flapper shaft (or, as discussed above in relation to FIG. 1, a separate shaft connected to a flapper shaft), and comprises a tooling connection 28 and a locking bar 30. The tooling connection 28 is sized to receive tools of a known type, so that the wrenching feature can be manually rotated to force a rotation of the flapper shaft. The wrenching feature 24 is aligned with an axis X of the shaft.

The locking system 26 comprises a socket 32 formed in the mount plate 18 and a stop element 34 sized to fit into the socket 32. The socket 32 is adjacent to the wrenching feature 24. Once manual rotation of the wrenching feature 24 is complete, the stop element 34 can be inserted into the socket 32, where the stop element 34 will interfere with the locking bar 30 of the wrenching feature 24 in order to prevent the flapper shaft from returning to the original, closed rotation.

In an arrangement, the stop element 34 also ordinarily forms part of the mechanism of the actuator 6 necessary for operation thereof, such that removal of the stop element 34 prevents the actuator 6 from functioning. For example, where the actuator is controlled by a servo valve, the stop element 34 closes a passageway that allows function of the servo valve. The stop element 34 can be moved from a first position, during ordinary operation, to a second position in the socket 32 as described above, for example after a failure or malfunction event. This provides a fail-safe option, where moving the stop element 34 serves a dual purpose of preventing the servo valve, and in turn the actuator 6, from functioning and also preventing return-rotation of the flapper shaft.

The rotary sensor 10 of the arrangement of FIG. 1 and the wrenching feature 24 of FIG. 1 are incompatible, as both features need to be arranged along the flapper axis X in order to interact with the flapper shaft. As such, these features have not to date been provided in the same valve.

Figure 3:
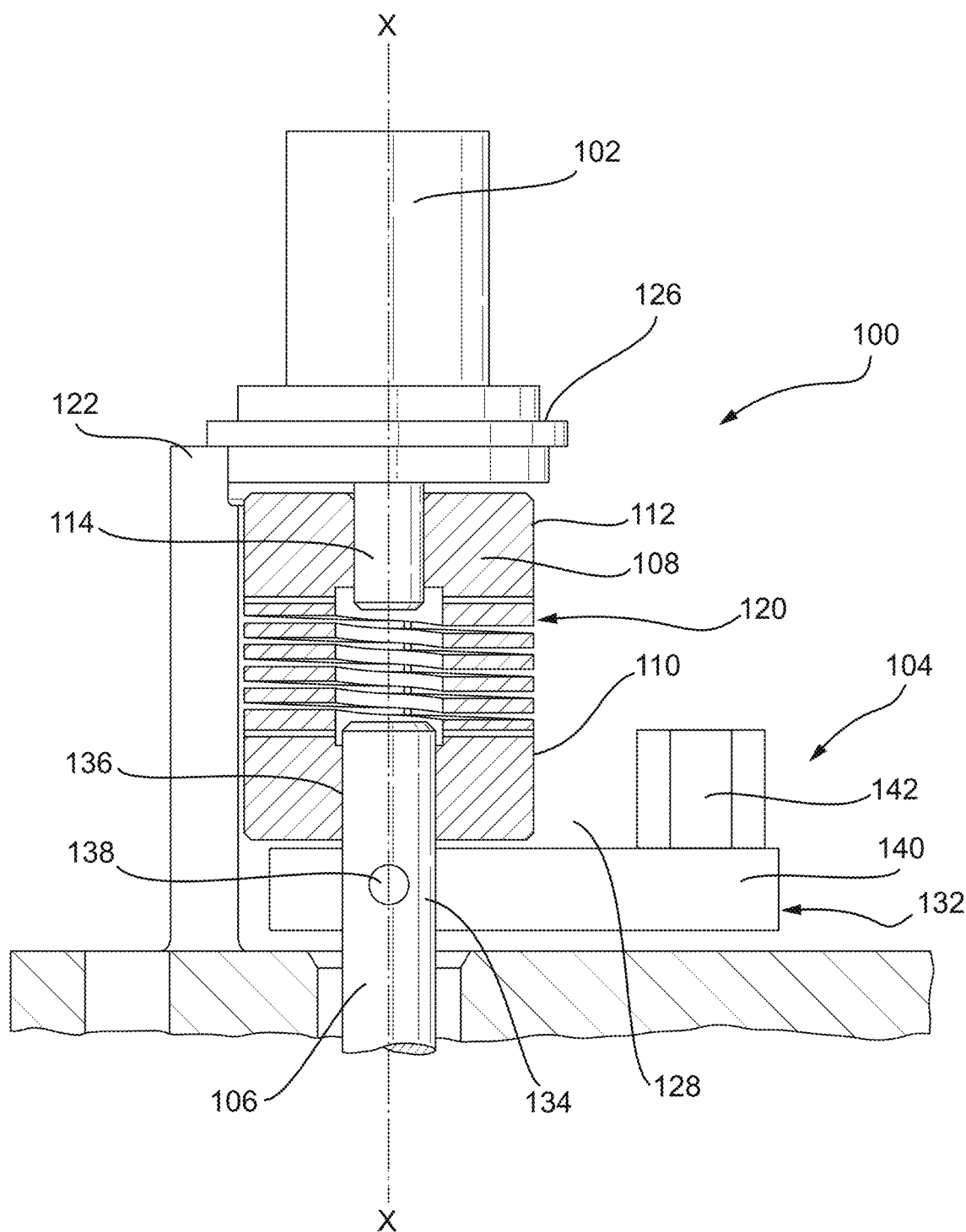
FIG. 3 shows a rotary valve according to an embodiment of the present disclosure.
Figure 4:
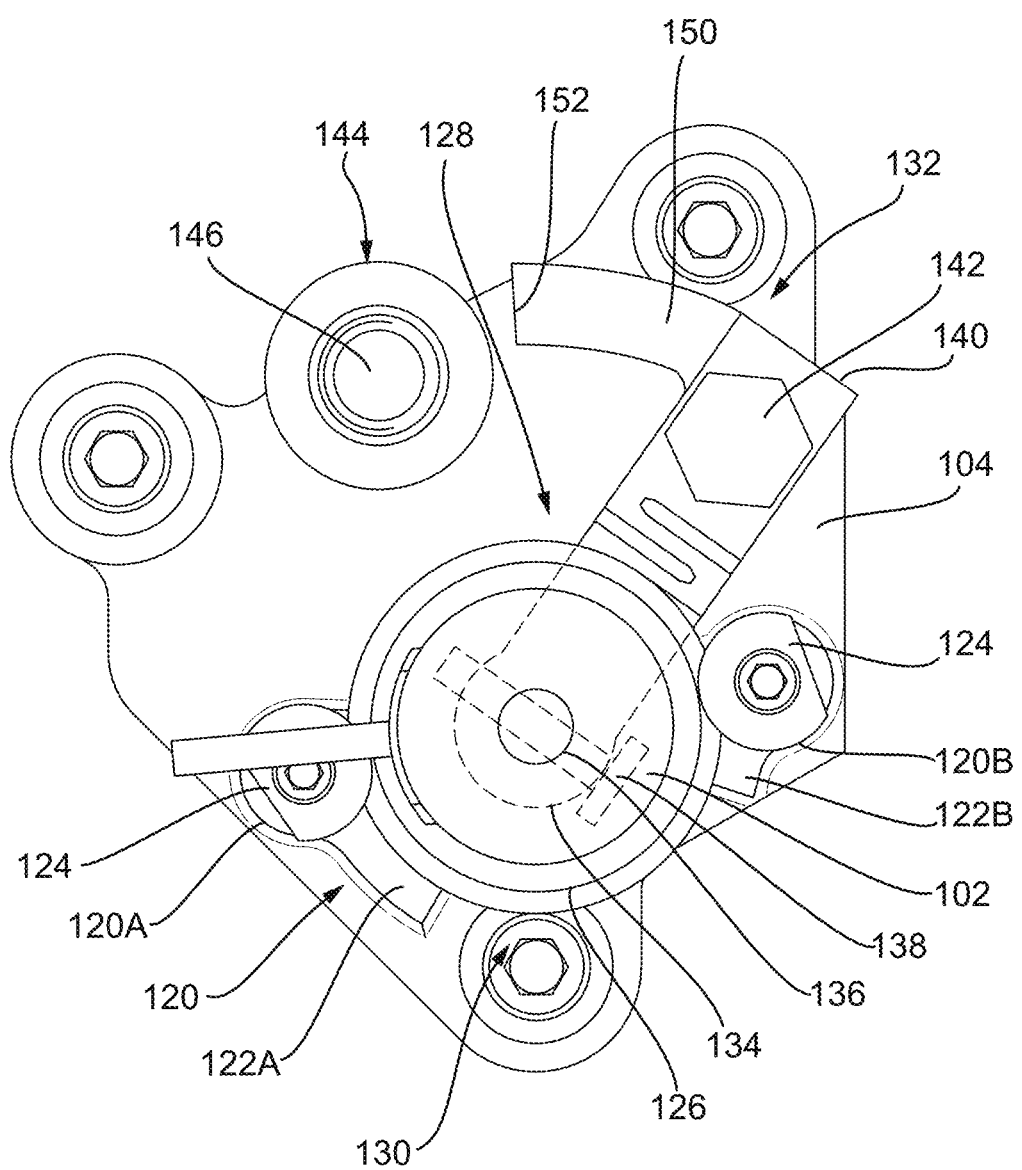
FIG. 4 shows a top-down view of the rotary valve of FIG. 3.
Figure 5:
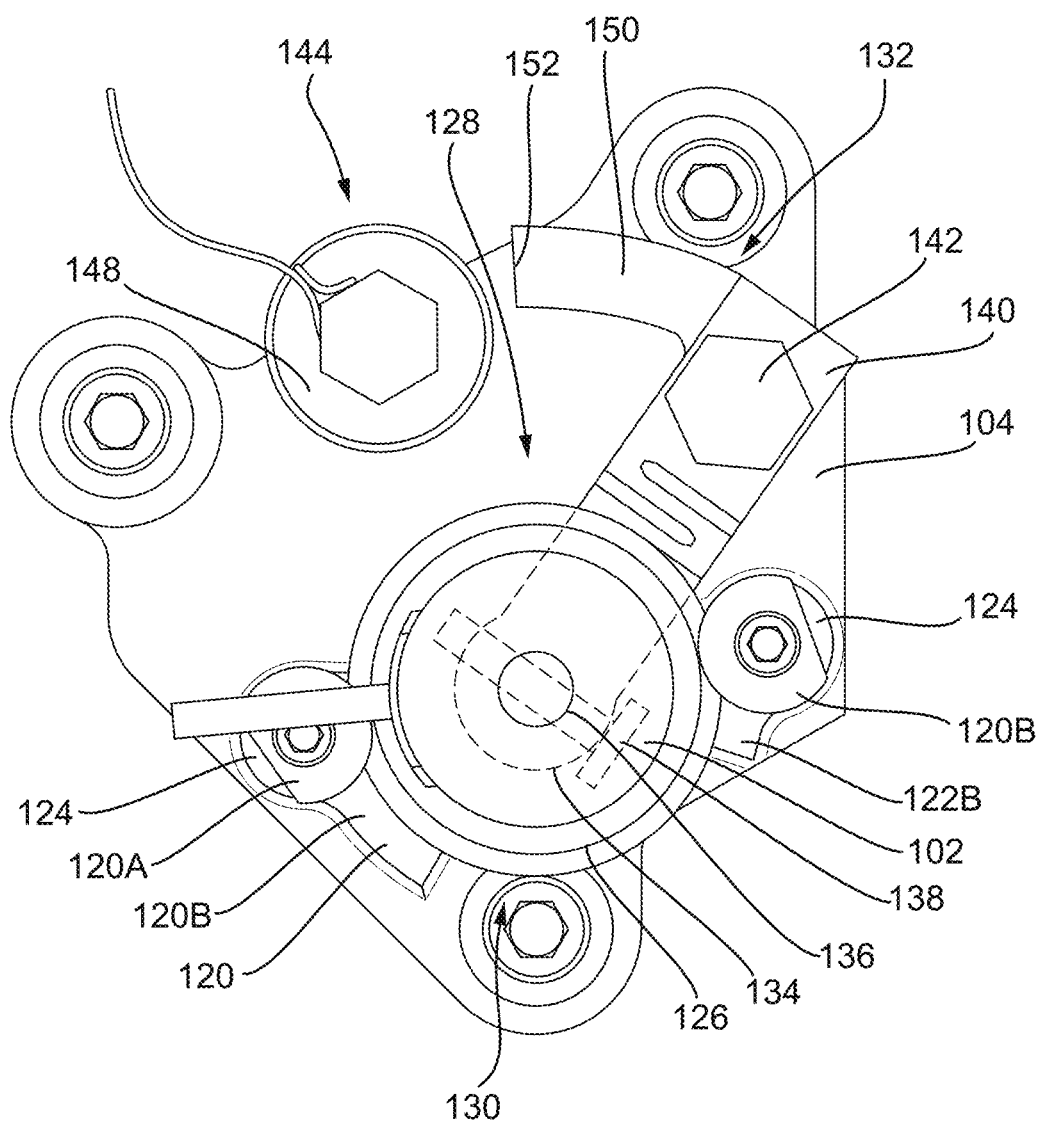
FIG. 5 shows another top-down view of the rotary valve of FIG. 3.

FIGS. 3 to 5 show various views of a part of a butterfly valve 100 in accordance with an embodiment of the present disclosure. The butterfly valve 100 comprises both a rotary sensor, in the form of a rotational transducer 102, and a wrenching feature in the form of a wrenching arm 104.

The butterfly valve 100 comprises a shaft 106 which is arranged along an axis X and connected to a flapper (not shown) in a similar manner to that described in relation to FIGS. 1 and 2. The shaft 106 is rotationally connected to a partially-deformable coupling 108, which is in turn rotationally connected to the rotational transducer 102.

To provide rotational connection, lower and upper ends 110, 112 of the coupling 108 may be provided with suitable keyed connections to the shaft 106 and to an input shaft 114 of the rotational transducer 102 respectively. In such a connection, for example between the shaft 106 and the coupling 108, the shaft 106 comprises a flat section for engagement of a corresponding flat section of the lower end 110 of the coupling 108, such that torque can be transferred from the shaft 106 to the coupling 108.

A support 116 comprises a transducer support portion 120 which extends from a mount plate 118 to an outer end 122. The outer end 122 of the transducer support portion 120 supports the rotational transducer 102, and constrains the rotational transducer 102 to the outer end 122, for example with washers 124 fastened to the top of the transducer support portion 120 and clamping a mounting flange 126 of the rotational transducer 102 to the outer end 122.

In the embodiment shown, the transducer support portion 120 comprises a pair of support columns 120A, 120B on opposed sides of the coupling 108. The support columns 120A, 120B are arc-shaped arranged around the axis X, and they are separated by a pair of arc-shaped openings 128, 130. As discussed, the transducer support portion 120 provides an outer end 122 upon which the rotational transducer 102 is supported, in this case a pair of outer ends 122A, 122B of the pair of support columns 120A, 120B. The arc-shaped support columns 120A, 120B extend in partial arcs circumferentially around the axis X, and may have a combined circumferential extent of at least 180 degrees, for example up to about in order to provide sufficiently large support columns 120A, 120B and outer ends 122A, 122B in order to support to the transducer 102 and provide sufficient area on the outer ends 122A, 122B to, for example, clamp the rotational transducer 102 to the transducer support portion 120.

In the embodiment shown, one of the openings is an enlarged arc opening 128. The provision of an enlarged arc opening 128 provides sufficient room for rotation of a wrenching feature.

The enlarged arc opening 128 is wider than the opposed arc opening 130. The enlarged arc opening 128 extends for at least about 90 degrees, for example between 90 to 120 degrees around the axis X to provide space for movement range and component width of the wrenching feature, as described further below. As discussed above, the support columns 120A, 120B may be of a particular circumferential extent, so the size of the opposed arc opening 130 may be comparatively reduced to provide room for both the enlarged arc opening 128 and the support columns 120A, 120B.

The wrenching feature 104 comprises a radially-extending arm 132 which is disposed partially radially inward of the transducer support portion 120 and projects radially through the enlarged arc opening 128. A radially inner end 134 of the arm 132 comprises an axial through-opening 136 through which the shaft 106 extends. The radially inner end 134 also comprises a rotationally fixed connection 138 to the shaft, which in one example may comprise a cotter pin connection through the arm 132 and the shaft 106.

The arm 132 also comprises a radially outer end 140 radially beyond the transducer support portion 120. The arm 132 comprises a tooling connection 142 which is positioned radially beyond the transducer support portion 120, in one example near the radially outer end 140. Hence, the tooling connection 142 is positioned out-of-axis, radially separated from the shaft axis X.

In this embodiment, the tooling connection 142 comprises a hex-shaped protrusion to cooperate with a wrench. In some embodiments, other shapes of protrusion may be used to cooperate with different tools. In some embodiments, the tooling connection may be a shape other than a protrusion, for example a recess or a through-hole. In other embodiments, a section of the arm 132 itself may provide the out-of-axis location for cooperation with a tool.

The tooling connection 142 is shaped to engage with a tool, so that the arm 132 of the wrenching feature 104 can be manually pivoted about the fixed connection 138 to the shaft 106, thereby manually rotating the shaft 106 and the connected flapper.

The enlarged arc opening 128 provides sufficient room for rotation of the arm 132 about the axis X in order to operate the wrenching feature 104. Generally, the arm 132 should be able to rotate by at least 90 degrees corresponding to open and closed positions of the valve. As described above, in order to provide room for the required rotation and for a width of the arm 132, the enlarged arc opening 128 may extend between 90 to 120 degrees about the axis X.

It can be seen that the radially-extending arm 132 provides an out-of-axis wrenching feature 104 so that means for manually operating the butterfly valve 100 can be provided in conjunction with a rotary sensor 102.

The butterfly valve 100 further includes a locking system 144 comprising a socket 146 and a stop element 148, for example a plug. The socket 146 is formed in the mount plate 118. In normal use of the valve 100, the socket 146 will be empty, as shown in FIG. 4. After manual rotation of the wrenching feature 104 to the position shown in FIG. 5, the stop element 148 can be placed into the socket 146 to engage with the wrenching feature 104 and prevent the wrenching feature 104 from returning to the original rotational position. To this end, the wrenching feature 104 comprises a rigid locking bar 150 extending circumferentially from the radially outer end 140 of the arm 132 and having an end 152 which will contact the stop element 148 when the stop element 148 is positioned in the socket 146. The contact between the end 152 and the stop element 148 prevents rotation of the wrenching feature 104 to the original position.

As described above, the stop element 148 may form part of a mechanism of an actuator (not shown) during ordinary operation of the valve 100. Removing the stop element 148 from the actuator mechanism to place in the socket 146 would therefore prevent function of the actuator, providing a fail-safe.

Figure 6:
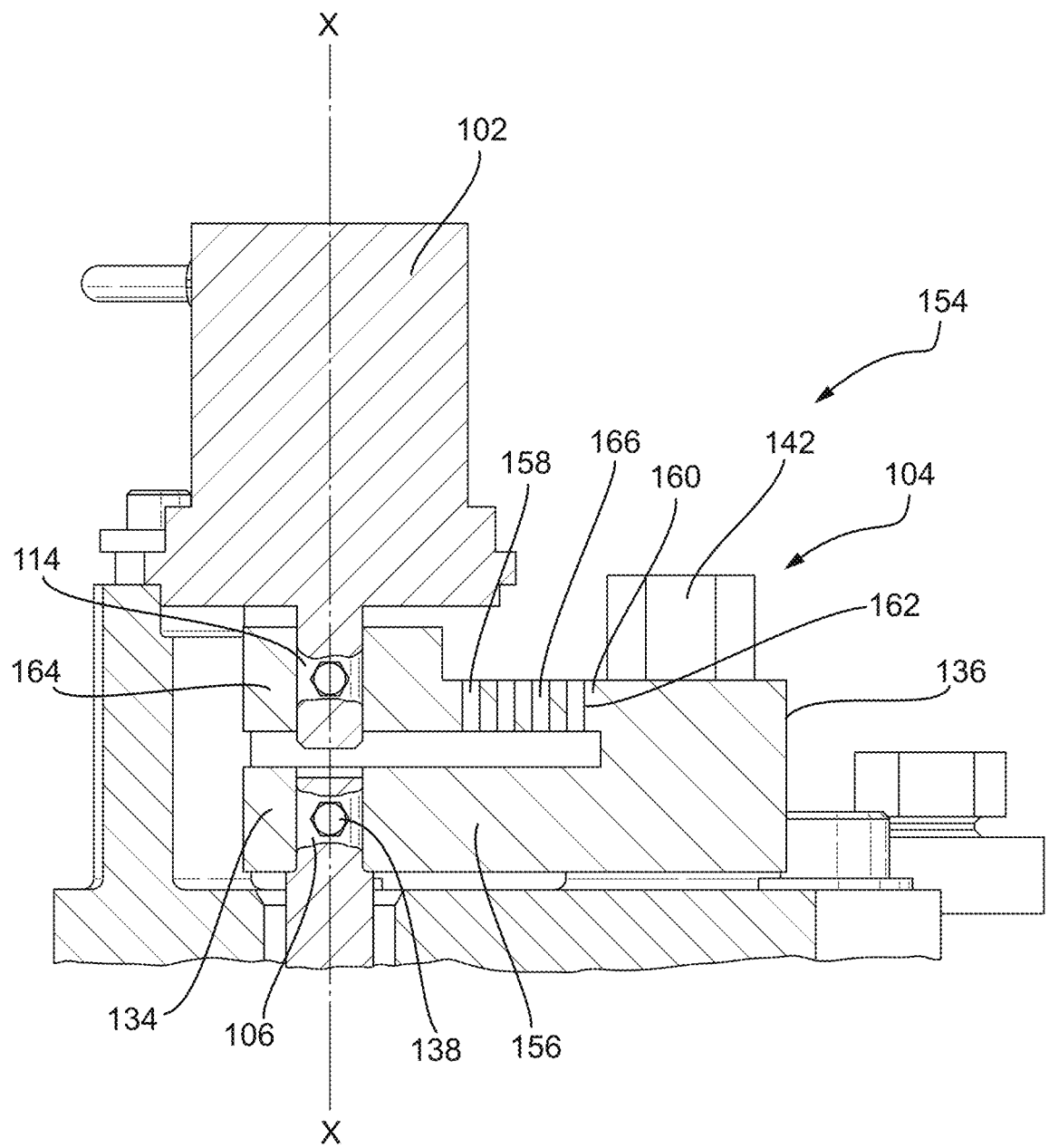
FIG. 6 shows a rotary valve according to another embodiment of the present disclosure.

FIG. 6 shows a sectional view of a part of a butterfly valve 154 in accordance with another embodiment of the present disclosure.

The butterfly valve 154 is similar to that described in relation to FIGS. 3 to 5, except as described below.

The wrenching feature 104 comprises a first arm 156 similar to the arm described in relation to the above embodiment, with a radially inner end 134 comprising a fixed connection 138 (for example a cotter pin or keyed connection) to the shaft 106, a radially outer end 136 including a tooling connection 142. Operation of the tooling connection 142 to manually rotate the shaft 106 is similar to that described above.

The butterfly valve 154 in this embodiment does not comprise a separate deformable coupling. Instead, the wrenching feature 104 further comprises a second arm 158 which is rotationally connected to the transducer input shaft 114, for example with a suitable keyed connection.

The second arm 158 also projects through the enlarged arc opening 128 in a similar manner to the first arm 156. The second arm 158 extends above and generally parallel to the first arm 156, and is connected at a radially outer end 160 to the radially outer end 140 of the first arm 156 to form a connection 162. In the embodiment shown, the connection 162 is provided by unitary formation of the first and second arms 156, 158. Radially inward from the connection 162, the second arm 158 is axially spaced above and separated from the first arm 156. A radially inner end 164 of the second arm 158 is therefore axially separated from the radially inner end 134 of the first arm 156. The radially inner end 164 of the second arm 158 comprises the connection to the rotational transducer 102 via the transducer input shaft 114, as described above.

The second arm 158 is generally deformable in the direction of, and transverse to, the axis X, while remaining substantially rigid to rotational forces around said axis X. The second arm 158 is less rigid than the first arm 156 in response to such axial or transverse forces. As such, the second arm 158 generally fulfils the function of the coupling of the previous embodiment by preventing transmission of potentially damaging axial and transverse forces to the rotational transducer 102.

Figure 7:
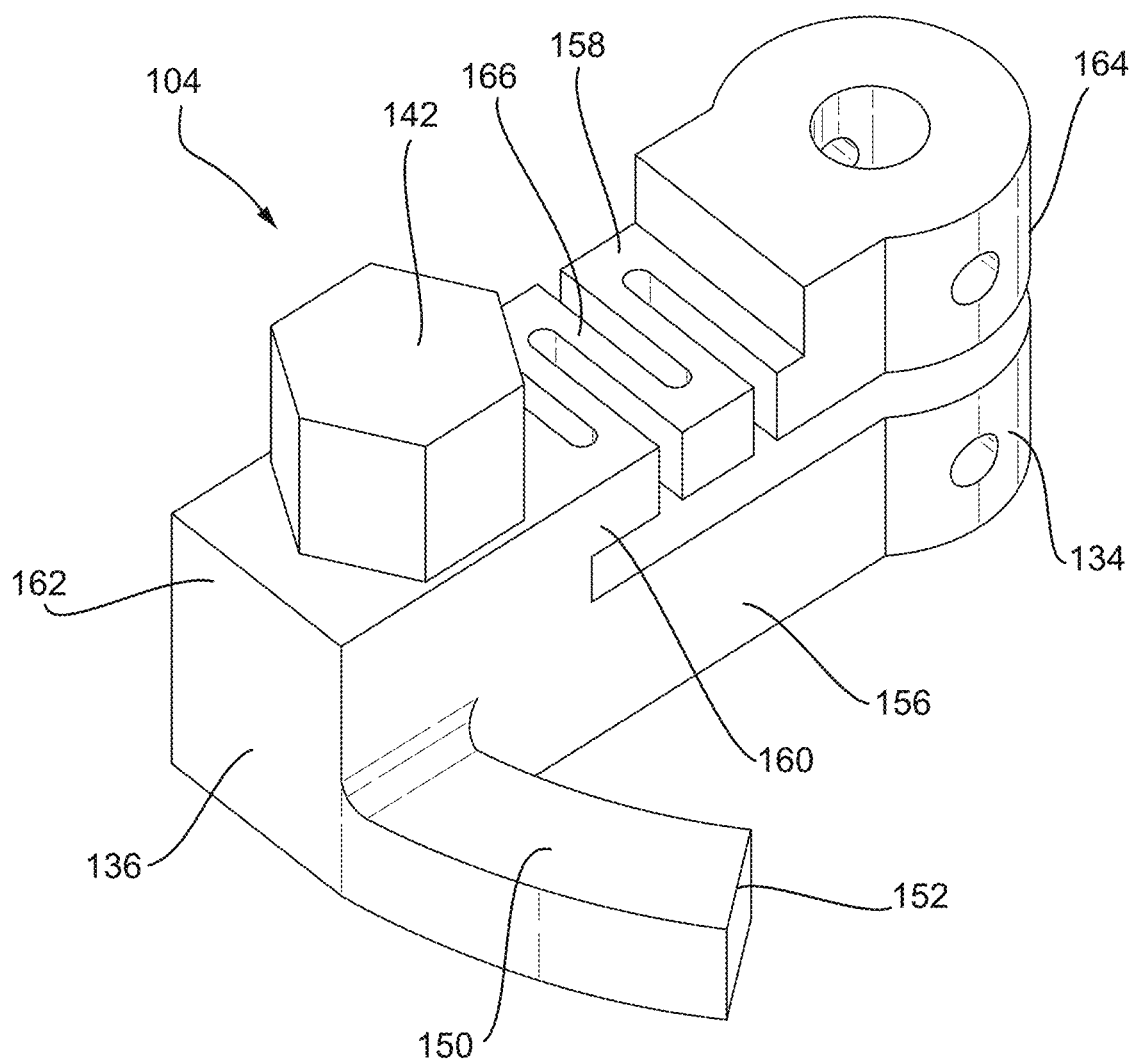
FIG. 7 shows a view of a wrenching mechanism of FIG. 6.
Figure 8:
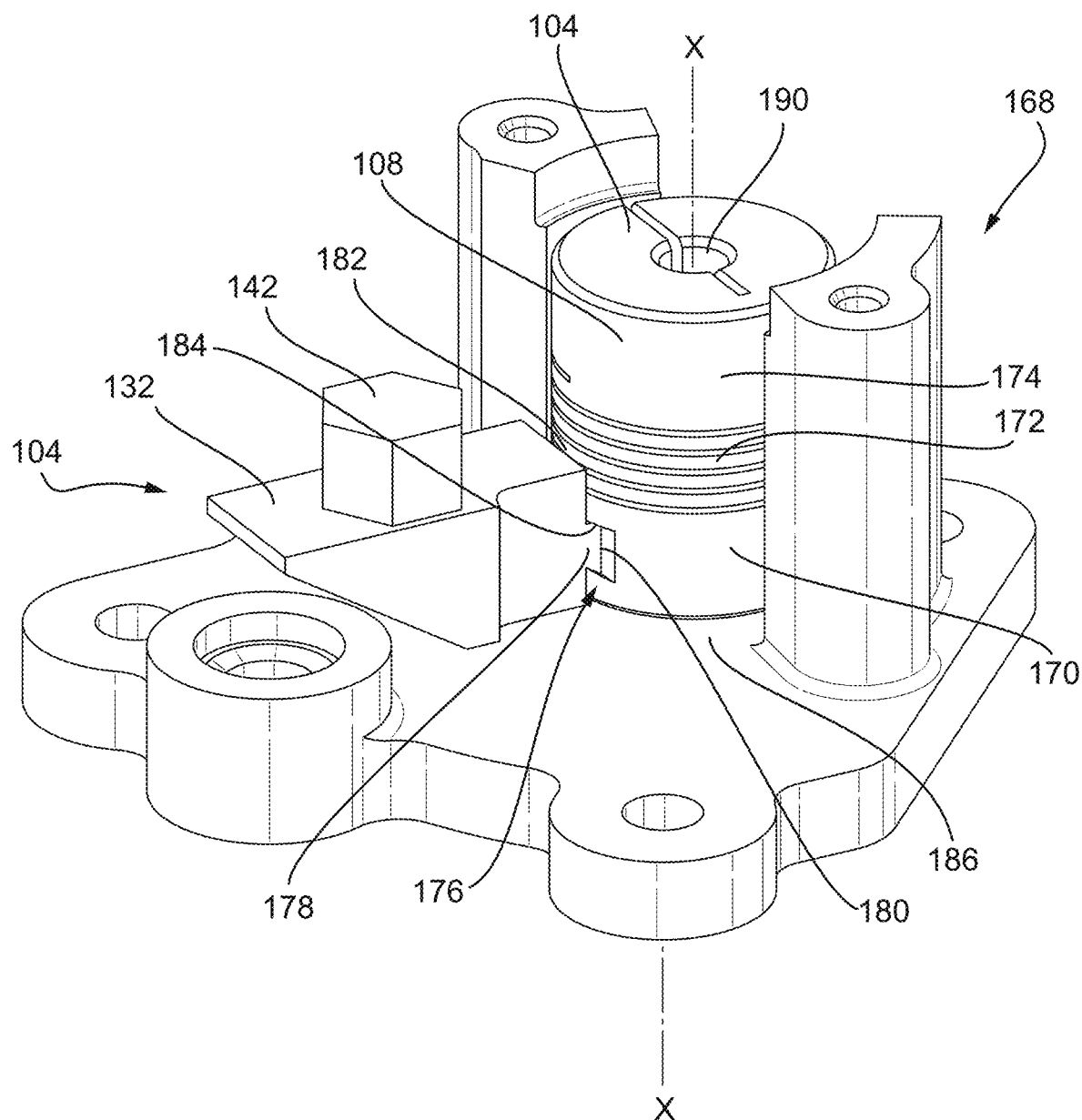
FIG. 8 shows a rotary valve according to another embodiment of the present disclosure.
Figure 9:
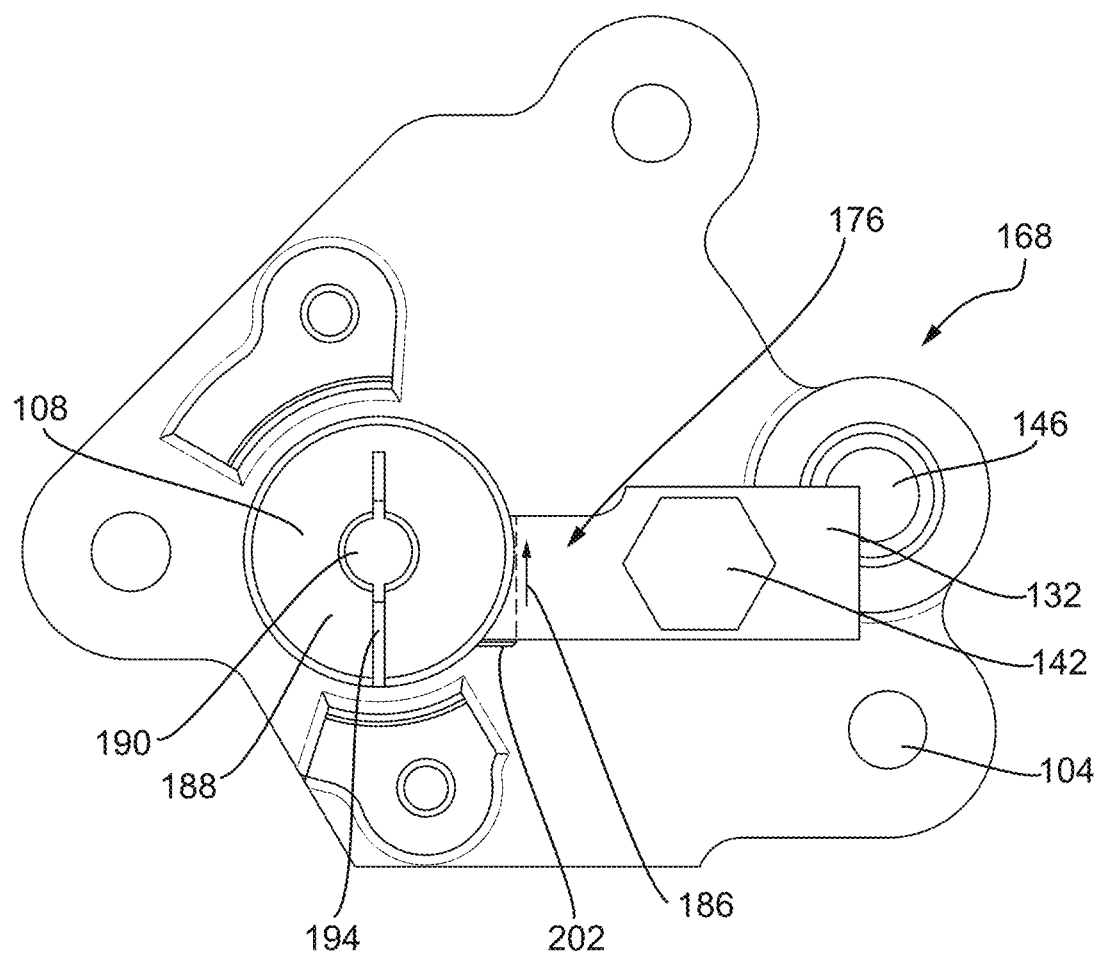
FIG. 9 shows another view of the rotary valve of FIG. 8.

An example wrenching feature 104 of the embodiment of FIG. 6 is shown in FIG. 7. The second arm 158 comprises a serpentine section 166 between the radially outer and radially inner ends 160, 164. The serpentine section 166 forms a section in the second arm 158 which has a reduced amount of material, the material extending in an S-shape between respective cutaways. This design allows the second arm 158 to readily deform in response to axial and transverse forces, while remaining sufficiently stiff in rotation, as described above in relation to the coupling of the previous embodiment.

Other means than a serpentine section, such as sections of different materials, may be used to provide a deformable section of the second arm 158, for example welded thin-wall bellows or overmolded polymer inserts.

As can best be seen in FIG. 7, the wrenching feature 104 further comprises a locking bar 150 with an end 152 which interacts with a locking system 144 of the valve 154 in a similar manner to the previous embodiment.

By using a wrenching feature 104 with a deformable section to fulfil the function of the coupling, the butterfly valve 154 eliminates the need for a separate coupling section, thereby reducing the number of components required. This has the further effect of desirably reducing the required height of the transducer support portion 120.

FIGS. 8 to 11 show another butterfly valve according to another embodiment of the present disclosure.

The butterfly valve is similar to that described in relation to FIGS. 3 to 5, except that the arm 134 of the wrenching feature 104 is directly connected to the coupling 108 rather than being rotationally fixed to the shaft 106, as described further below.

The coupling 108 comprises a lower portion 170 and an upper portion 174, separated by a substantially deformable middle portion 172. In the embodiment shown, the middle portion 172 comprises a spiral shape around the axis X, the spiral joined at respective ends to the lower and upper portions 170, 174. The middle portion 172 is deformable axially and transversely relative to the axis X, while remaining substantially rigid rotationally. The lower and upper portions 170, 174 are substantially rigid, and are more rigid than the middle portion 172.

Figure 10:
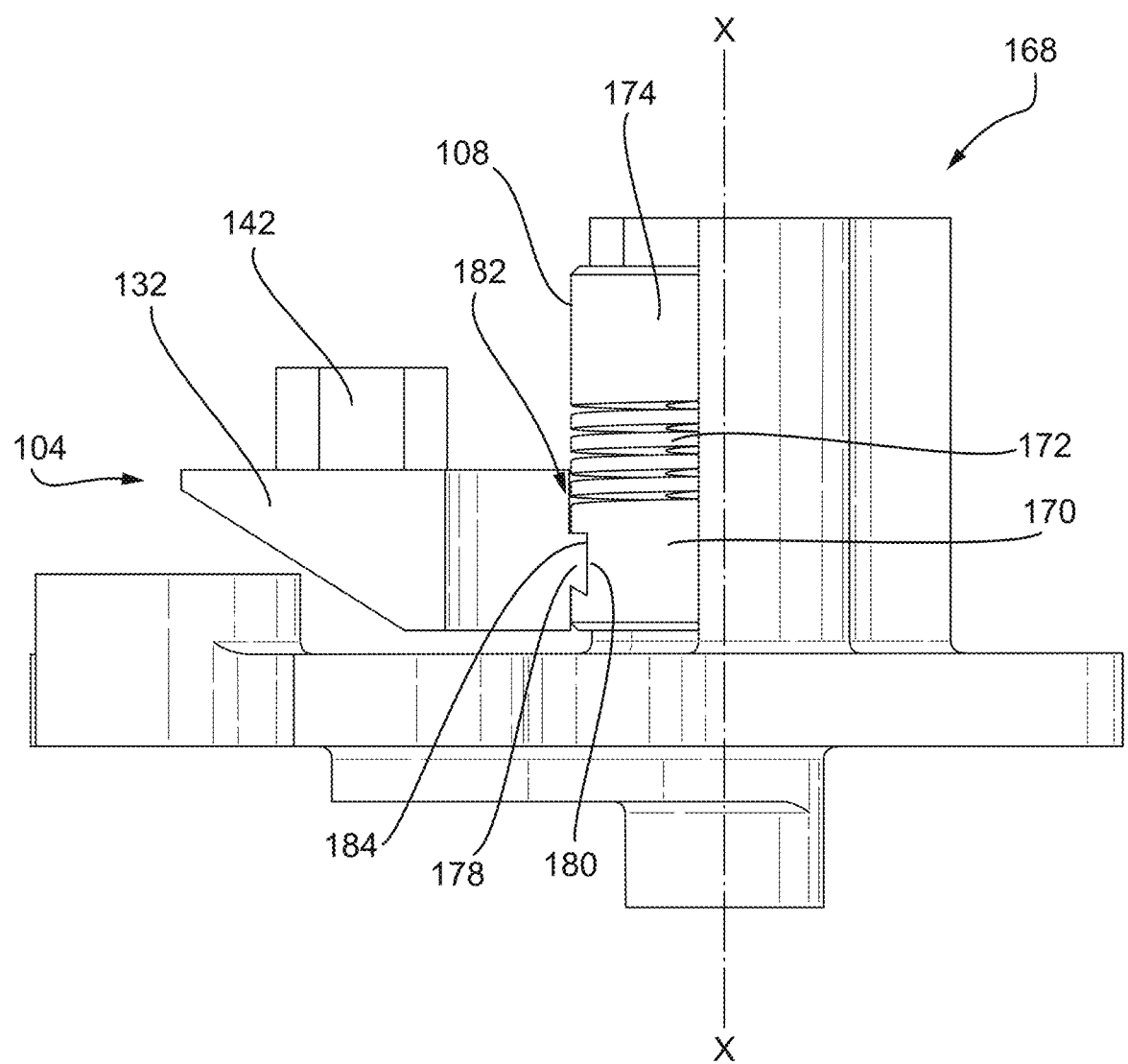
FIG. 10 shows another view of the rotary valve of FIG. 8.

As best seen in FIG. 10, the arm 132 is directly connected to the lower portion 170 of the coupling 108 at a joint 176, for example a dovetail joint. In the embodiment shown, the joint 176 is formed of a protrusion 178 from the arm 132 of the wrenching feature 104 received in a correspondingly-shaped slot 180 in the lower portion 170 of the coupling 108. The dovetail shape of the slot 180 allows the protrusion 178 of the arm 132 to be slid into the slot 180 only in a direction tangential to the coupling 108. The slot 180 comprises an open end 182 and a closed end 184, such that the protrusion 178 can only be slid into and out of the slot 180 in one direction 186, and removed in the reverse direction.

The lower and upper portions 170, 174 of the coupling 108 are annular in shape around the axis X, forming respective lower and upper openings 188, 190 therethrough for receiving the shaft 106 and the transducer input shaft 114 respectively. The coupling 108 comprises lower and upper axial splits 192, 194 fully extending axially through the lower portion 170 and upper portion 174 of the coupling 108 respectively, interrupting the annular shapes thereof to result in a discontinuous ring cross-section.

Figure 11:
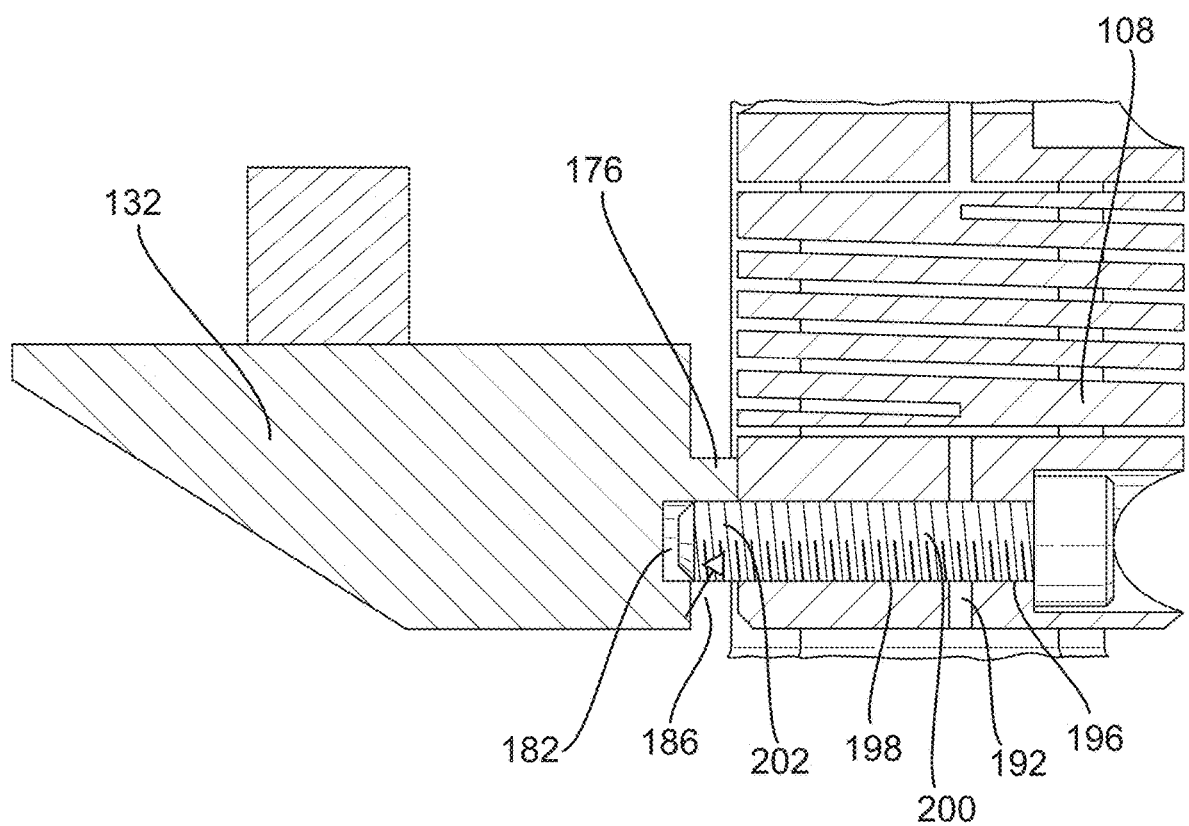
FIG. 11 shows a detail of the rotary valve of FIG. 8 taken along axis line x-x.
Figure 12:
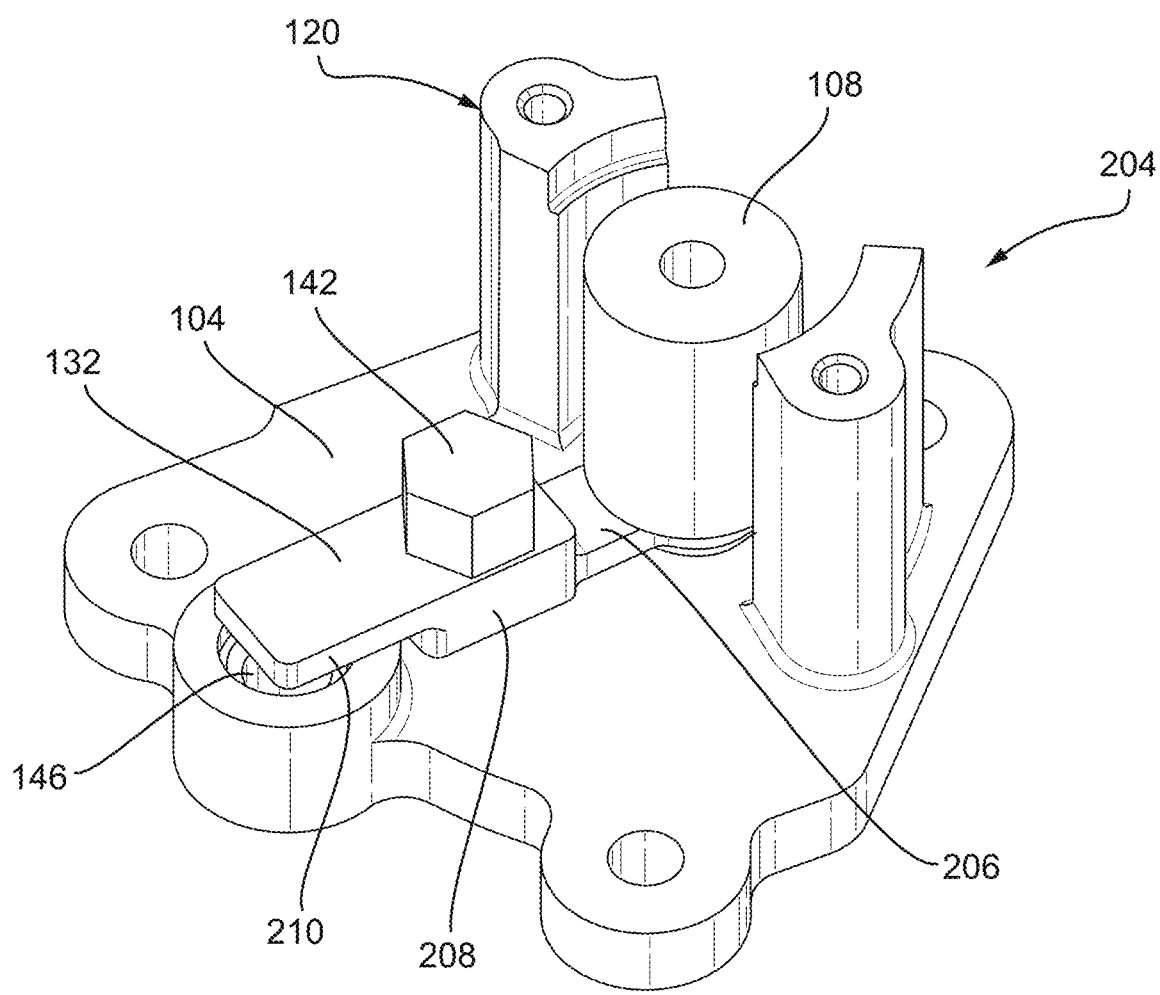
FIG. 12 shows a part of another rotary valve according to another embodiment of the present disclosure.
Figure 13:
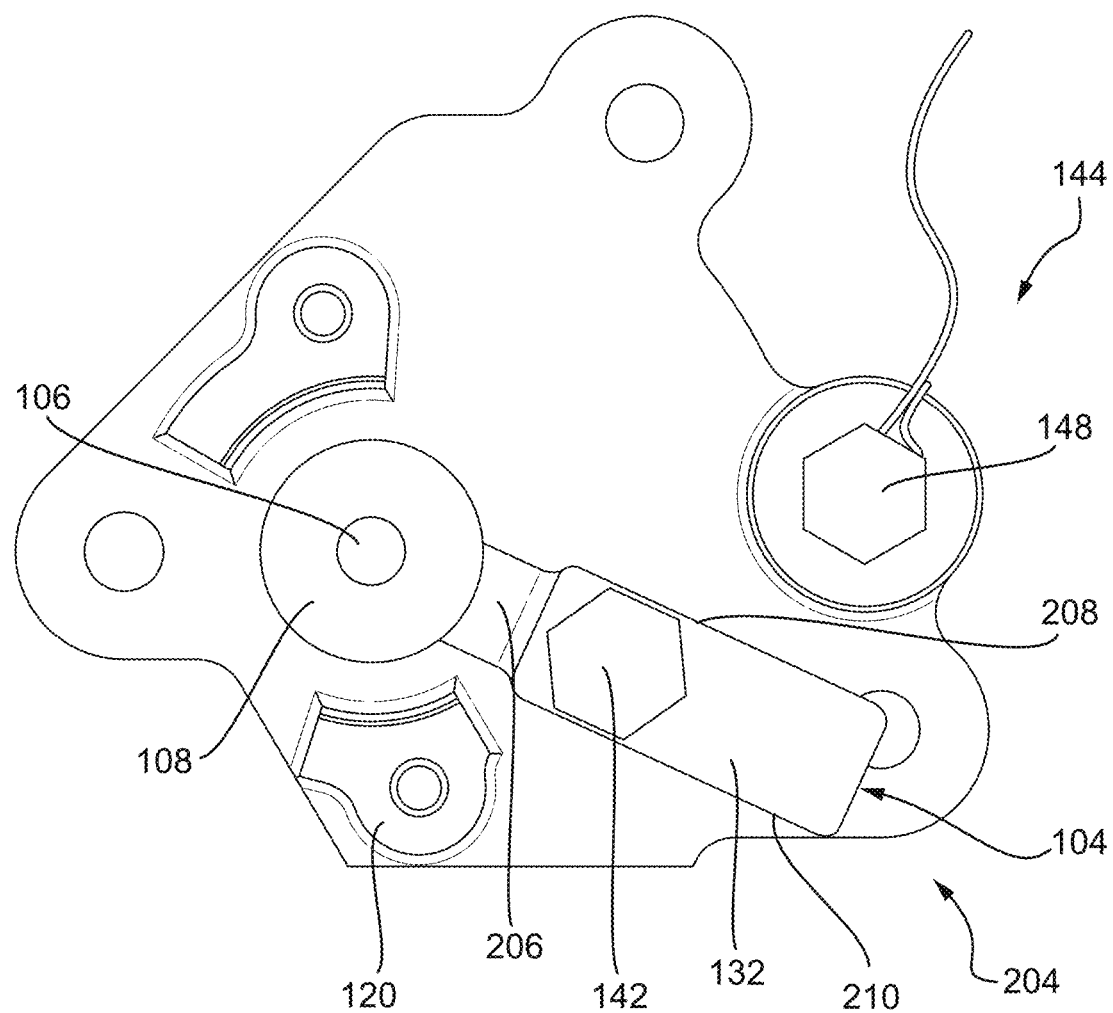
FIG. 13 shows a top-down view of the rotary valve part of FIG. 12.
Figure 14:
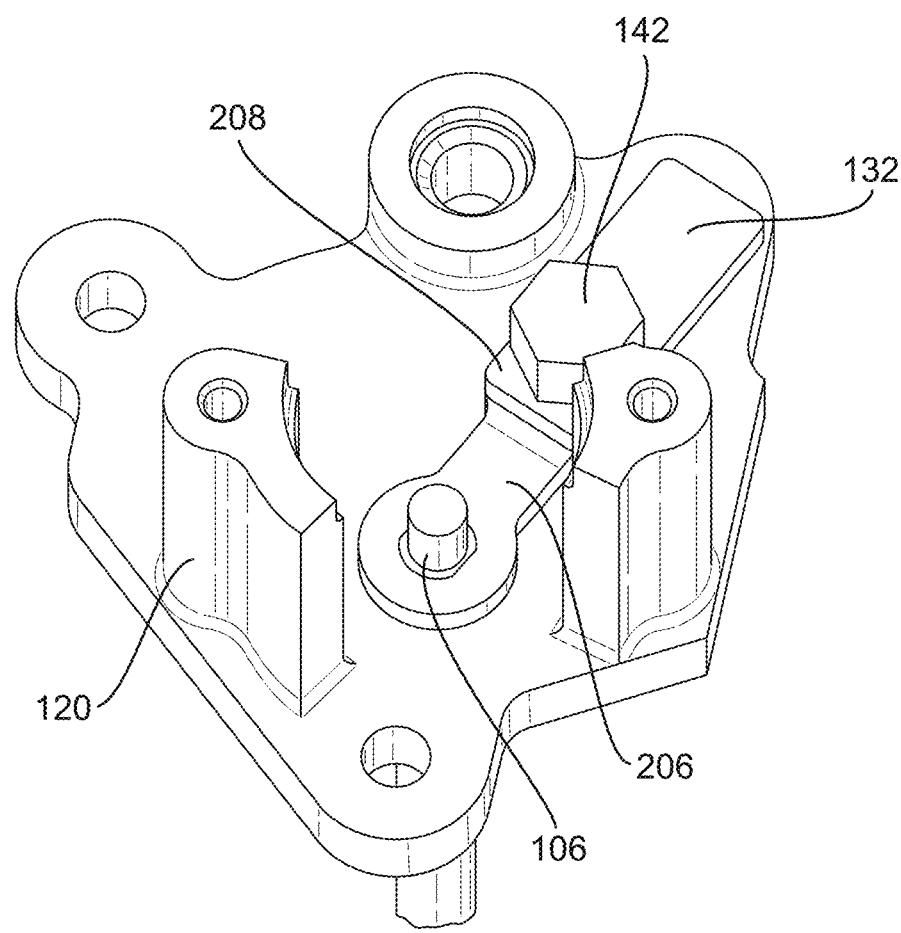
FIG. 14 shows the part of FIG. 12 with a coupling removed.

As shown in FIG. 11, the lower portion 170 of the coupling 108 further comprises a pair of threaded holes 196, 198 arranged on opposed sides of the lower axial split 192. A lower screw 200 is inserted through both of the threaded holes 196, 198. Upon tightening of the lower screw 200, the lower split 192 is pulled closed and the diameter of the lower opening 188 is reduced by the lower portion 170 compressing into the lower axial split 192. This action frictionally engages the lower portion 170 with the shaft 160 for rotational movement therewith.

The upper portion 174 may include a similar pair of threaded holes (not shown), and a similar upper screw (not shown), for corresponding engagement between the upper portion 174 and the transducer input shaft 114.

The position of the lower screw 200 can also be arranged such that a distal end 202 thereof extends fully through each of the pair of threaded holes 196, 198. The distal end 202 of the screw 200 protrudes from the lower portion 170, adjacent to the open end 182 of the slot 180 in the lower portion 170 and substantially blocking the otherwise-open end 182. As such, if the screw 200 is inserted into the pair of threaded holes 196, 198 after the arm 132 is joined to the lower portion 170, the distal end 202 interferes with the protrusion 178 and prevents it from being slid out of the slot 180 in the reverse of the direction 186 of insertion. As such, the screw 200 also serves to lock the wrenching feature 104 to the lower portion 170 of the coupling 108.

Directly attaching the wrenching feature 104 to the coupling 108 eliminates the need for an elongated arm to connect a tooling connection 142 to the shaft 106. This simplifies the construction of the butterfly valve 168, and further results in a reduced height of the transducer support portion 120.

FIGS. 12 to 15 show a butterfly valve 204 in accordance with another embodiment of the present disclosure.

The butterfly valve 204 is similar to that described in relation to FIGS. 3 to 5, except for changes to the wrenching feature 104 described below.

The wrenching feature 104 comprises an arm 132 similar to the arm of the embodiment of FIG. 3, but with a first reduced thickness portion 206 which is relatively thinner than the rest of the arm 132 in an axial direction, the first reduced thickness portion 206 being provided at the radially inner end 134 of the arm 132. The reduced axial size allows the coupling 108 to sit lower on top of the wrenching feature 104, reducing the required height transducer support portion 120. Additionally, a reduced axial size of the transducer support portion 120 has been found to desirably improve resistance of the support portion 120 to acceleration and vibration.

Figure 15:
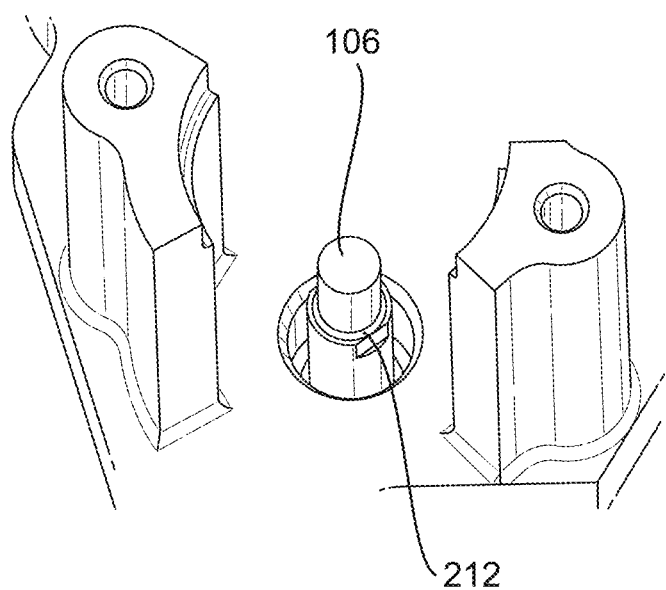
FIG. 15 shows a further detail of the embodiment of FIG. 12.

As shown in FIG. 15, in this embodiment, the rotationally fixed connection between the arm 132 and the shaft 106 is provided by a keyed connection 212.

The arm has a tooling connection 142 disposed on a full thickness portion 208 which is radially outwards from the first reduced thickness portion 206. The full thickness portion 208 is approximately the same axial thickness as that of the embodiment of FIG. 3, hence relatively thicker than the reduced thickness portion 206. The increased thickness provides reinforced structure for the tooling connection 142.

As compared to the embodiment of FIG. 3, the tooling connection 142 is closer to the axis X in the radial direction. This minimises the forces exerted on the first reduced thickness portion 206 during operation of the wrenching feature 104, which might otherwise experience increased stresses due to the reduced amount of material compared to the arm of FIG. 3.

The butterfly valve 204 comprises a similar locking system 144 to the above embodiments. As the tooling connection 142 is disposed closer to the axis X in the radial direction, it is disposed radially inward of the position of the socket 146. A second reduced thickness portion 210 projects radially outward from the full thickness portion 208 to provide the additional radial extent required to engage the stop element 148 when it is positioned in the socket 146. The second reduced thickness portion 210 has a reduced thickness in the axial direction as compared to the full thickness portion 208, and hence provides the locking system functionality with minimal use of material.

Figure 16:
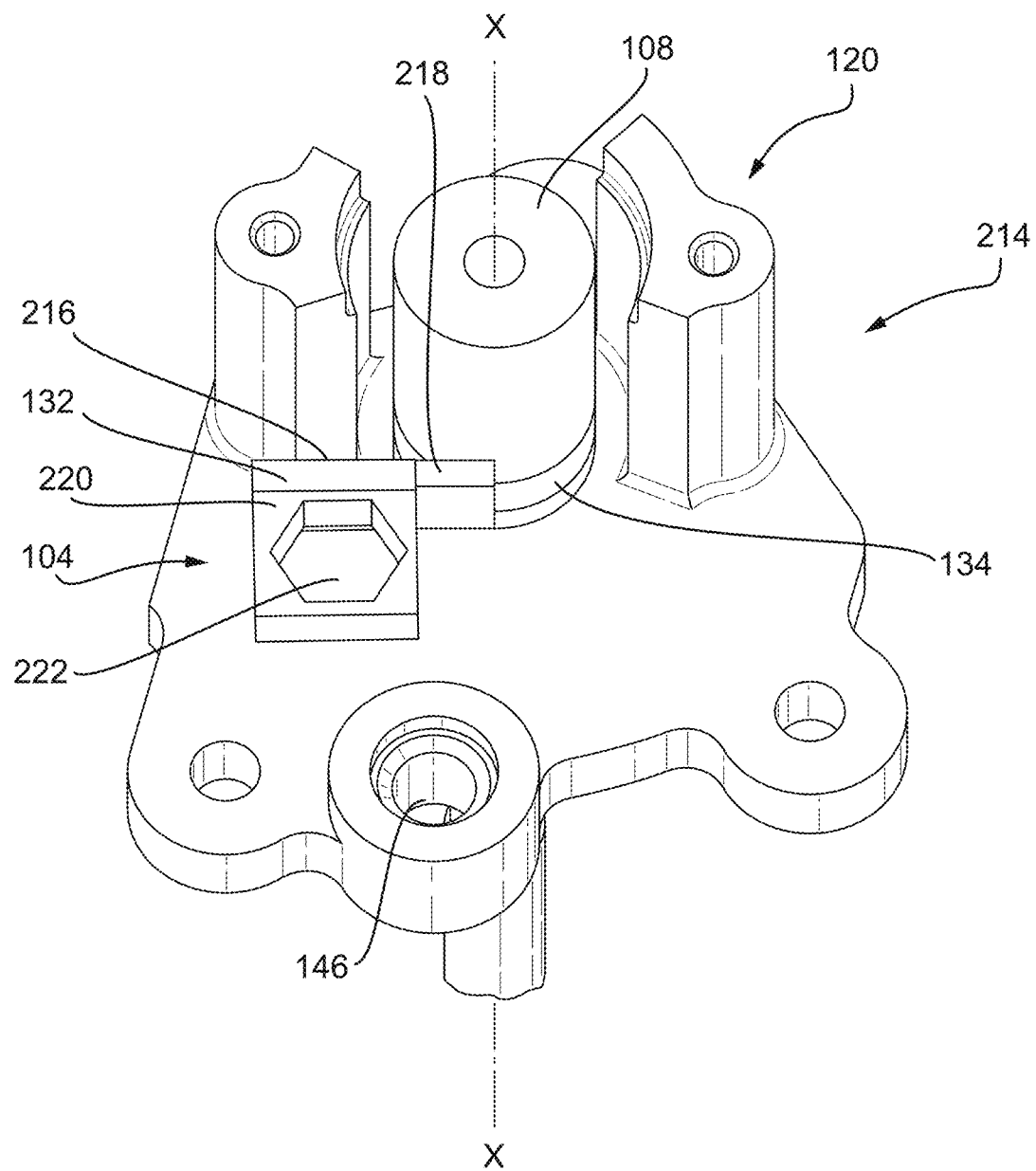
FIG. 16 shows a part of a rotary valve according to another embodiment of the present disclosure.
Figure 17:
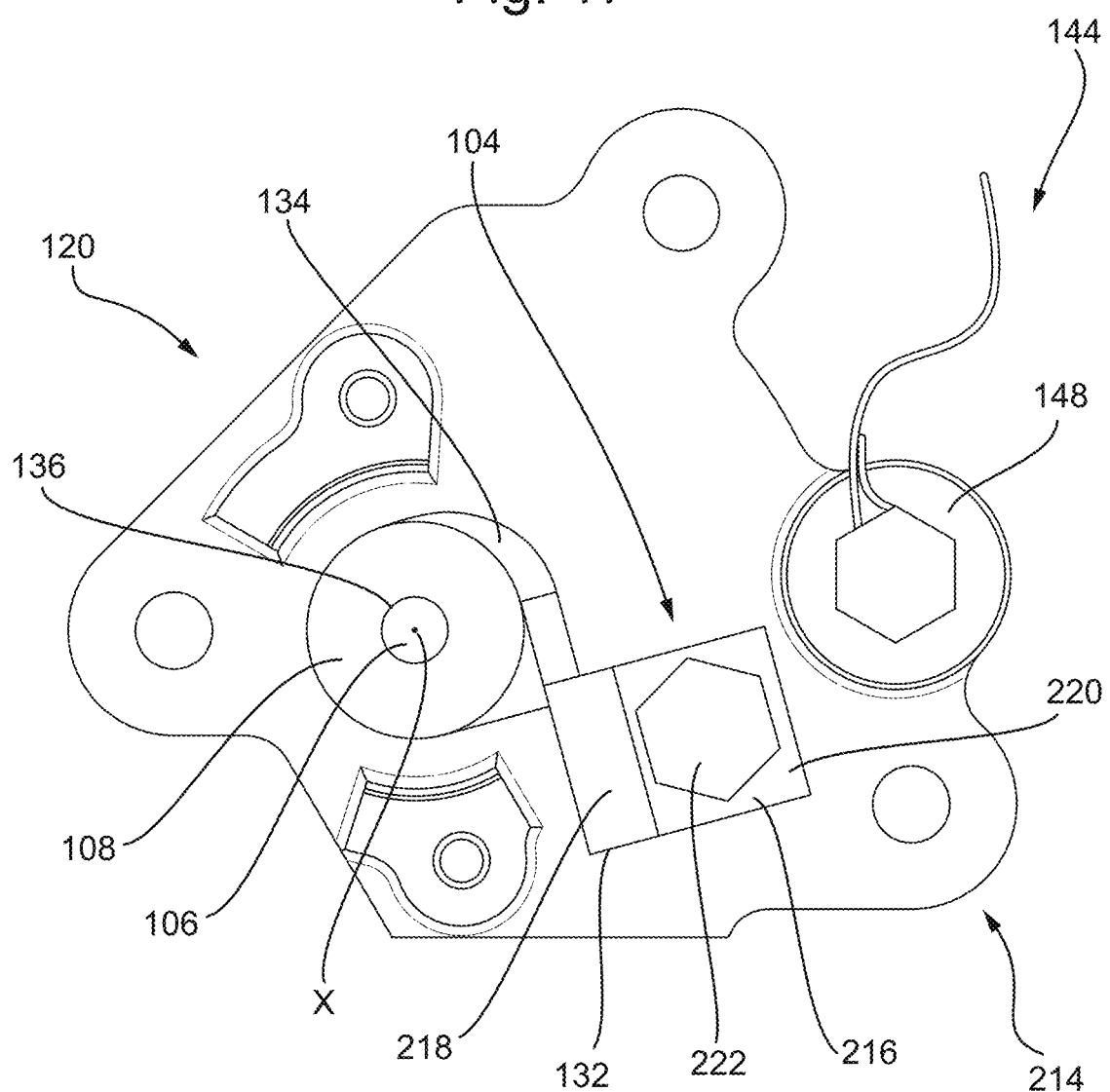
FIG. 17 shows a top-down view of the rotary valve of FIG. 16.

FIGS. 16 and 17 show a butterfly valve 214 in accordance with another embodiment.

The butterfly valve 214 is similar to that described in relation to FIGS. 3 to 5, except for changes to the wrenching feature 104 described below.

The embodiment comprises a wrenching feature 104 formed of a single, unitary piece of sheet metal 216. As in previous embodiments, the arm 132 comprises a radially inner end 134 which has an axial through-opening 136 for engagement with the shaft 106. The arm 132 extends generally radially overall, but in this embodiment comprises two portions 218, 220 extending in different directions which are not directly in the radial direction. A first, radially inner, portion 218 which extends tangentially from the radially inner end 134, and generally transverse to the axis. A second portion 220 extends perpendicular from the first portion 218, hence also extending generally transverse to the axis X. The described shape can be more easily formed from the single, unitary piece of sheet metal 216.

The valve comprises a similar locking system 144 to that described above, and the second portion 220 can engage with the stop element 148 when it is in position in the socket 146.

The tooling connection is provided on the second portion. In order to reduce manufacturing complexity, the tooling connection 222 in this embodiment comprises a cutaway of material from the second portion 220.

By using a single piece of sheet metal 216, the wrenching feature 104 of this embodiment is simplified, and can be more easily manufactured. The use of a relatively thin material also allows the coupling 108 to sit lower on the wrenching mechanism 104, reducing the required height of the transducer support section 120.

The skilled person would understand that some of the features of the above embodiments could be combined in different combinations to those shown.

The above embodiments are provided by way of description only, and are not intended to be limiting. Modifications may be made to the arrangements disclosed without departing from the scope of the disclosure. For example while illustrated in the context of a butterfly valve, the disclosure can be applied to other types of rotary valves. The scope of protection is to be determined only from the following claims.

The invention claimed is:
1. A rotary valve comprising:
a valve shaft coupled to a rotary valve element, the valve shaft defining an axis and being rotatable thereabout;
a rotary position sensor;
a coupling rotationally coupling the valve shaft and the sensor;
a wrenching arm rotationally coupled to the valve shaft, the wrenching arm extending radially outwardly of the axis for attachment of a wrenching tool thereto, wherein the coupling is axially between the rotary position sensor and the wrenching arm;
a valve housing, the valve housing comprising a socket formed therein, wherein the shaft extends axially through the valve housing; and
a stop element for selective engagement with the socket;
wherein the socket is positioned such that the wrenching arm configured to engage the stop element to prevent rotation of the wrenching arm around the axis.
2. The rotary valve of claim 1, wherein the wrenching arm is directly coupled to the valve shaft.
3. The rotary valve of claim 1, wherein the wrenching arm comprises a tooling connection disposed thereon.
4. The rotary valve of claim 3, wherein the tooling connection includes a protrusion of material or a cutaway.
5. The rotary valve of claim 1 wherein, the wrenching arm extends radially from the axis.
6. The rotary valve of claim 1, wherein the wrenching arm comprises a first section extending generally transverse to the axis, and a second section extending generally perpendicular from the first section, the tooling connection optionally being disposed on the second section.
7. The rotary valve of claim 1, wherein the wrenching arm is formed from a unitary piece of sheet metal.
8. The rotary valve of claim 1, wherein the wrenching arm is keyed to the valve shaft.
9. The rotary valve of claim 1, further comprising:
a second arm, unitarily formed with the wrenching arm and axially separated therefrom, the second arm rotationally coupled to the sensor, the wrenching arm and second arm thereby together forming the coupling between the valve shaft and the sensor.
10. The rotary valve of claim 9, wherein the second arm is flexible.
11. The rotary valve of claim 10, wherein the second arm comprises a flexible serpentine portion.
12. The rotary valve of claim 1, wherein the coupling comprises:
an upper portion a lower portion axially separated by a deformable middle portion, the upper and lower portions being more rigid than the deformable middle portion, the sensor being attached to the upper portion and the wrenching arm being directly connected to the lower portion of the coupling.
13. The rotary valve of claim 12, wherein the direct connection comprises:
a dovetail slot having a closed end and an open end for receiving the wrenching arm.
14. The rotary valve of claim 13, wherein the coupling forms an generally annular shape around the shaft, the annular shape interrupted by a split extending axially along the coupling, the coupling comprising:
a screw cooperating with at least one threaded hole on one side of the split, and the coupling engaging with the shaft on tightening of the screw, the screw projecting over the open end of the dovetail slot to retain the wrenching arm therein.
15. The rotary valve of claim 1, wherein the wrenching arm comprises a blocking element for engagement with the stop element.

* * * * *